(12) United States Patent
Nohl et al.

(10) Patent No.: US 6,349,819 B1
(45) Date of Patent: Feb. 26, 2002

(54) BELT CONVEYER IDLER SUPPORT FRAME

(75) Inventors: Jerry D. Nohl; Neil E. Schmidgall; Darin J. Buss, all of Morris, MN (US)

(73) Assignee: Astec Industries Inc., Cattanooga, TN (US)

( * ) Notice: Subject to any disclaimer, the term of this patent is extended or adjusted under 35 U.S.C. 154(b) by 0 days.

(21) Appl. No.: 09/578,306

(22) Filed: May 25, 2000

(51) Int. Cl.⁷ ............................................... B65G 15/08
(52) U.S. Cl. ...................................... 198/830; 198/860
(58) Field of Search ................................ 198/860, 830, 198/828, 824, 825; 403/399, 409

(56) References Cited

U.S. PATENT DOCUMENTS

| | | | | |
|---|---|---|---|---|
| 4,475,648 A | * | 10/1984 | Weeks ......................... | 198/830 |
| 5,044,490 A | | 9/1991 | East ............................. | 198/830 |
| 5,360,097 A | | 11/1994 | Hibbs ........................... | 198/313 |
| 5,373,935 A | * | 12/1994 | Anderson ..................... | 198/830 |
| 5,655,642 A | | 8/1997 | Lawrence et al. ............ | 193/37 |

* cited by examiner

Primary Examiner—Kenneth W. Noland
(74) Attorney, Agent, or Firm—Nilles & Nilles SC (57) ABSTRACT

A belt material handling system including conveyor belts supported on a belt conveyor idler support frame. Brackets are provided for supporting one or multiple idler rollers on such a frame. One form of such brackets has a tab for retaining the shafts in the end bracket that can be precisely bent over the shaft end by providing a cut that extends generally at right angles from a slot. The adjacent ends of a center and an outer roller shaft in a center combined bracket are retained by a single tab that can be bent into locking position over adjacent ends of the shafts. A conveyor return bracket can be utilized either as a left- or right-hand bracket or it can be used as a simple rise bracket. This return bracket uses novel shaped flanges which act to position the shaft in an enlarged portion of the slot, then the slotted portion of the shaft is pressed into holding engagement in the narrow portion of the slot. A tab on the flange is then bent over the upper side of the shaft to hold the shaft in locked engagement in the bracket.

9 Claims, 7 Drawing Sheets

BELT CONVEYER IDLER SUPPORT FRAME

BACKGROUND OF THE INVENTION

1. Field of the Invention

The present invention pertains to belt material handling systems including conveyor belts that are supported on belt conveyor idler support frames. More specifically, the invention has to do with the idler support frame itself and specific construction of the brackets for supporting one or multiple idler rollers of such a frame, which rollers in turn support a conveyor belt for transporting bulk materials.

The use of long stretches of conveyors for the transportation of bulk material are a cost efficient and reliable means for transporting material from place to place. It is known to use a multitude of idler support frames to support and partially form a flexible conveyor belt into a moving trough upon which sand, gravel, coal, grain or other bulk materials can be transported.

2. Brief Description of the Prior Art

Idler support frames for supporting one or more multiple idler rollers are fabricated from angle iron, sheet metal and stamped or cast uprights together to form an idler support frame. These fabrications are usually welded structures made up of numerous pieces including an elongated frame consisting of elongated rails and numerous cross bars between the spaced apart rails, and also includes vertical posts between the upper cross bars and the lower cross bars to thereby form a rigid structure. This frame member supports an upper trough comprising a plurality of rollers arranged to form a trough to support a belt thereon. The frame also supports a series of lower flat rollers that act to support the return portion of the conveyor belt.

Brackets are provided for both the upper trough rollers and the lower return rollers, and these brackets are usually formed from being welded to the support frame or being stamped from sheet steel members which are in turn fastened to the support frame. Such brackets are necessary for each of the trough rollers and return rollers.

Examples of such belt conveyors are shown in the U.S. Pat. No. 5,044,490 issued Sep. 3, 1991 to East. Another example of the prior art devices of this character is shown in the U.S. Pat. No. 4,475,648 issued Oct. 9, 1984 to Weeks. Still another example of such a prior art device is shown in U.S. Pat. No. 5,360,097 issued Nov. 1, 1994 and U.S. Pat. No. 5,655,642 issued Aug. 12, 1997.

SUMMARY OF THE INVENTION

The present invention provides idler roller support brackets that are economical to manufacture, install and assemble with their rollers. One aspect of the invention relates to a combined central roller and outer roller support bracket in which adjacent ends of the center roller and outer roller are mounted in a slot. A single tab is formed in the combined support bracket and can be bent over the adjacent ends of the center roller and outer roller to firmly embrace the ends of the rollers and hold them securely in place. In this manner a single bracket is used to securely hold adjacent ends of the center roller and the outer roller.

Another aspect of the invention relates to an outboard outer roller support bracket which is fabricated from sheet steel by being pressed therefrom and which has a slot at its upper end in which the milled ends of the shaft roller can be inserted. The outer end of the support bracket has a tab formed therein by being cut at a right angle from the slot so that after the roller shaft is inserted in the slot the tab can be bent squarely across the top of the roller to hold the latter secure in the support bracket. This outer roller bracket has a lower end with an integrally formed foot portion that can be rigidly secured to the frame.

Still another aspect of the invention relates to a flat return carrier bracket for supporting the return run of the conveyor belt and which is formed to accommodate either left or right sides of the conveyor to support the return rollers of the conveyor. This bracket also has a third opening to accommodate a roller so it can be used as a rise bracket for a flat carrier. The arrangement is such that the shaft is inserted in the bracket to a point determined by a stamped portion of the bracket, it is then pushed downwardly so that the shaft is engaged by the bracket by its milled sides and then the shaft is held in position by the end of the tab which is turned over the shaft end. In this manner a minimum number of brackets is necessary.

BRIEF DESCRIPTION OF THE DRAWINGS

FIGS. 16–21 are views of a carrier bracket for holding the flat, return portion of the flexible conveyor. More specifically.

BRIEF DESCRIPTION OF THE PREFERRED EMBODIMENTS

Figure 1:
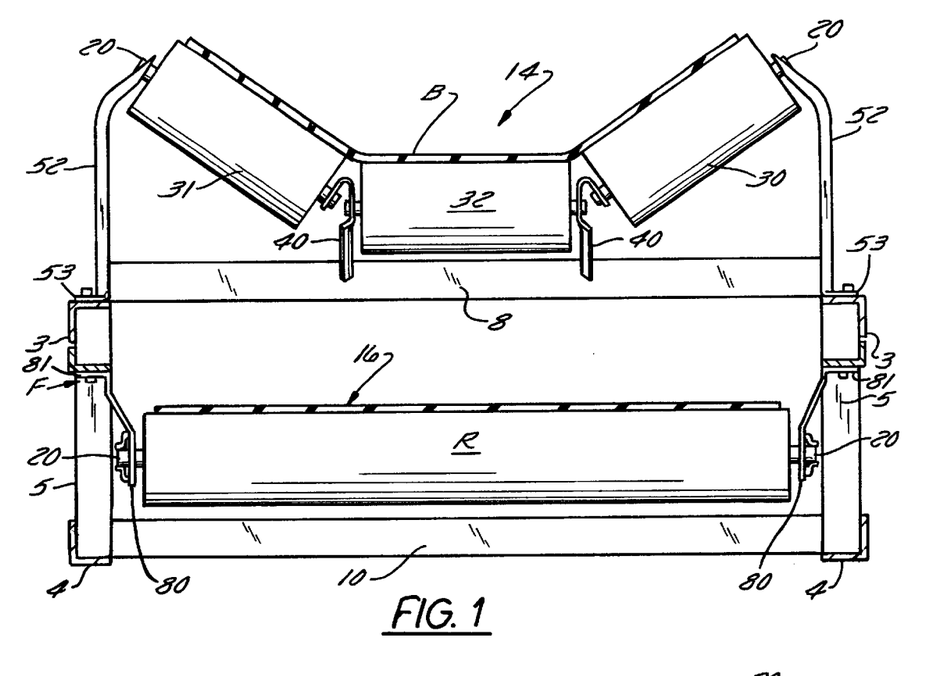
FIG. 1 is a cross sectional view through a trough conveyor having an upper series of trough rollers for an endless conveyor belt and also having a lower flat belt return conveyor roller and a combined bracket used as a conveyor return bracket.
Figures 2, 3:
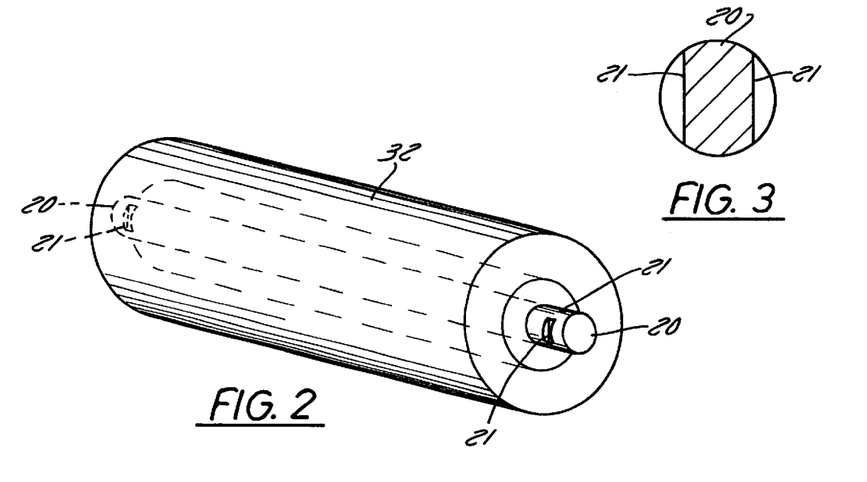
FIG. 2 is a perspective view of a typical roller in such a conveyor and having opposite slots milled in its ends.
FIG. 3 is a cross sectional view of a shaft end, being enlarged from that shown in FIG. 2, and showing the two opposite milled slots.

The conveyor includes an elongated frame F that is fabricated from angle iron rails 3 that may be of considerable length. A lower rail 4 also of angle iron is welded or otherwise secured to the upper rail 3 by means of posts 5 that are spaced along the length of the conveyor. The posts are also formed of angle iron as is the lower cross bar 10 which is welded or otherwise secured to the posts and rails of the conveyor. Thus the frame F supports the trough shaped upper conveyor 14 and the flat return conveyor 16 which is of conventional construction and includes a roller R having a shaft 20 which extends therethrough and from each side thereof and these shafts have a pair of milled slots 21 on opposite sides thereof as shown in FIG. 2.

The upper trough rollers include the outer rollers 30 and 31 that are inclined at an angle and extend outwardly from the center roller 32. The flexible, endless conveyor belt B is trained around the upper trough rollers and the lower return roller in the conventional manner.

Figures 10, 11:
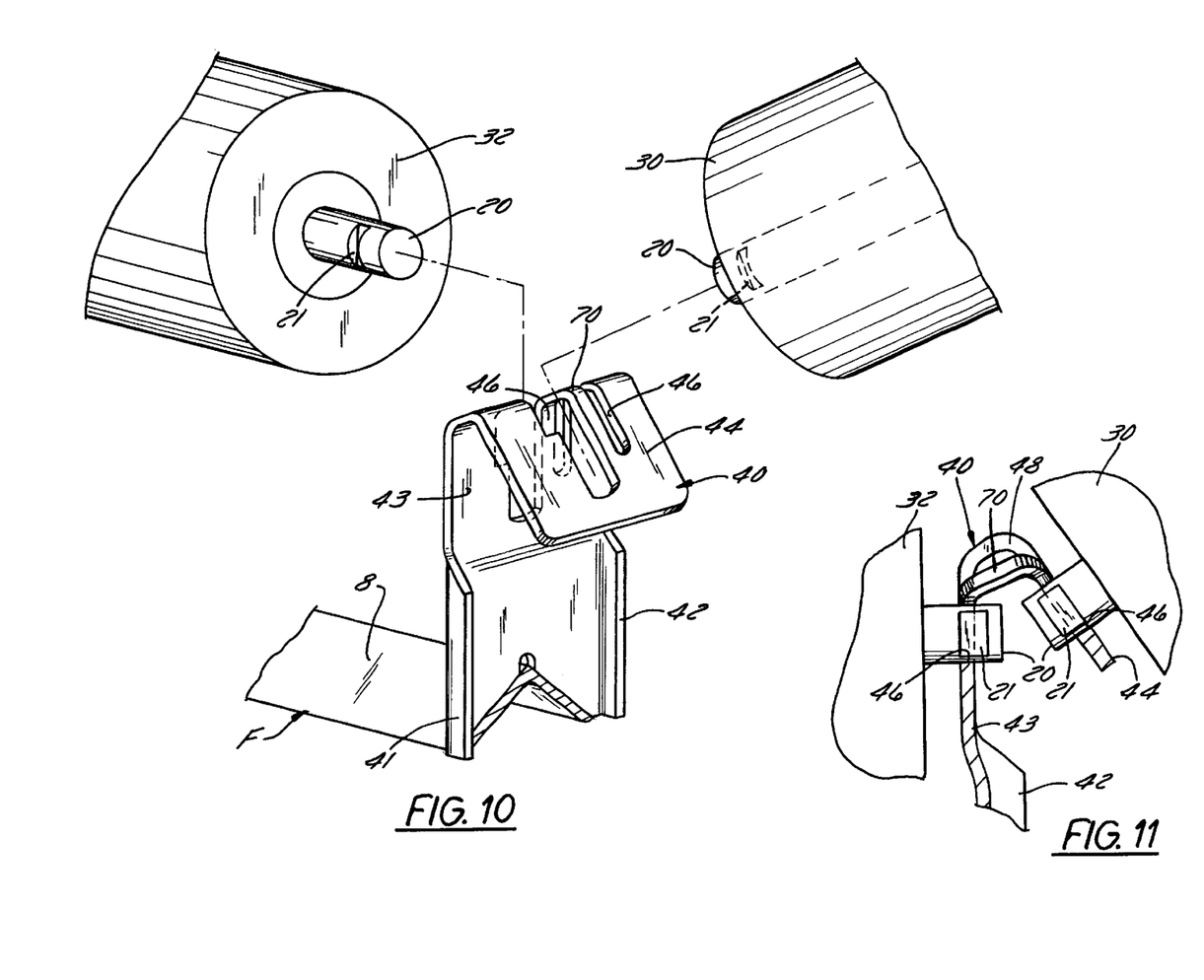
FIG. 10 is a perspective, fragmentary view of the combined center roller and outer roller support bracket with the center roller and outer roller about to be positioned in their respective slots.
FIG. 11 is a view of the rollers after they have been inserted in their slots and the common arcuate shape tab has been twisted or pounded over the adjacent ends of the shafts to hold them in position.
Figures 12, 13, 14, 15:
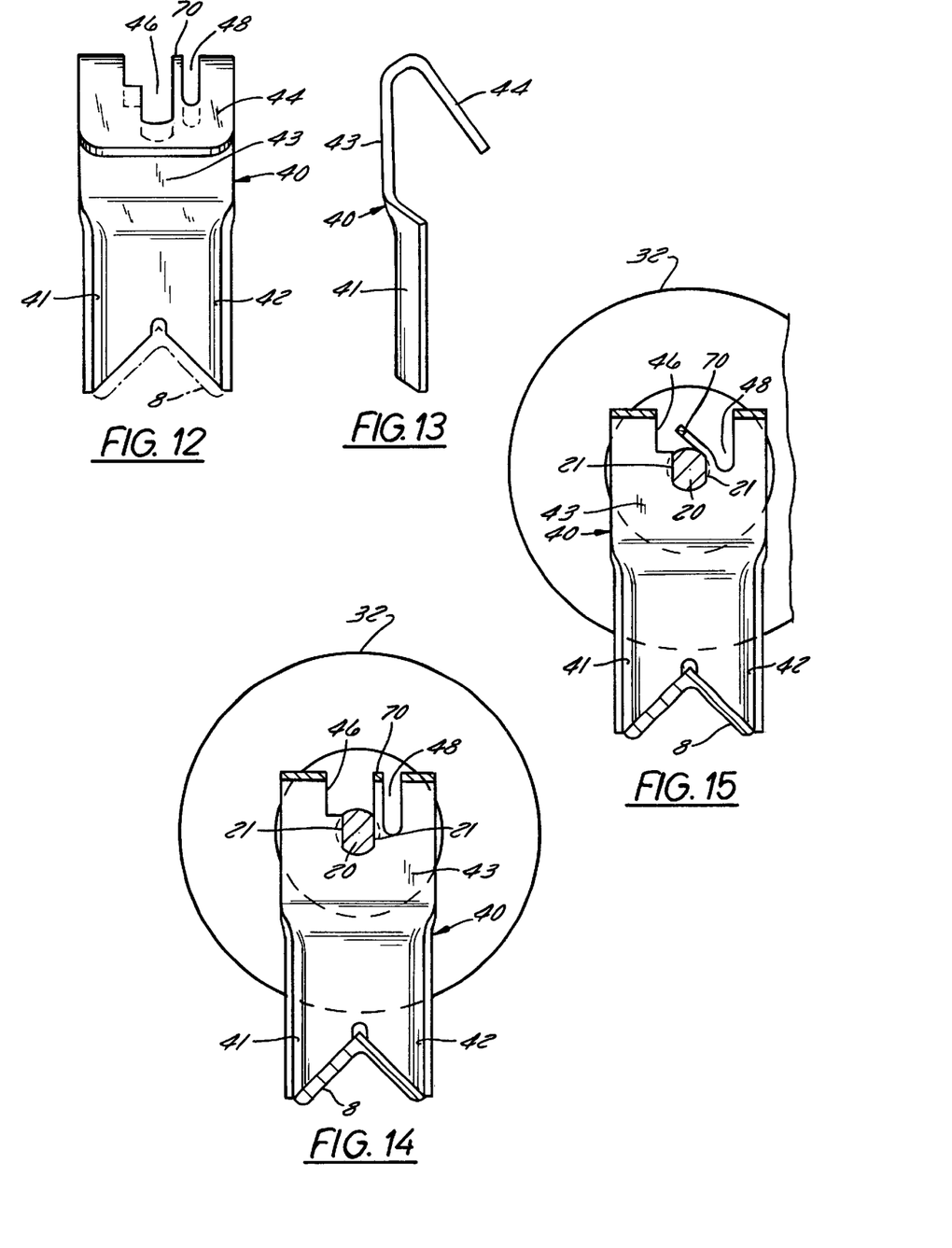
FIG. 12 is another view of the combined bracket shown in FIG. 10.
FIG. 13 is a side view of the bracket shown in FIG. 12.
FIG. 14 is a view of the bracket shown in FIG. 12 but with the inner roller being inserted in its slot.
FIG. 15 is a view similar to FIG. 14 but showing the arcuate tab after it has been pounded or otherwise forced over the shaft to hold it captive.

A combined center roller and outer roller support bracket 40 (FIGS. 4 & 10) is welded to the cross bar 8 and is fabricated from sheet steel and has strengthening flanges 41 and 42 formed therein (FIG. 10). The combined support bracket is bent over at its top side to provide a generally A-shaped form having an inner leg 43 and an outer angled leg 44. A slot 46 is cut through both legs 43 and 44 and receives the milled ends 21 of the shafts 20 of rollers 32 and 30, respectively. Another narrower slot 48 is also cut through the portions 43 and 44 of the bracket and this slot 48 is generally parallel and adjacent to the slot 46 as clearly shown in FIGS. 4, 10, 12, and 14.

Figure 4:
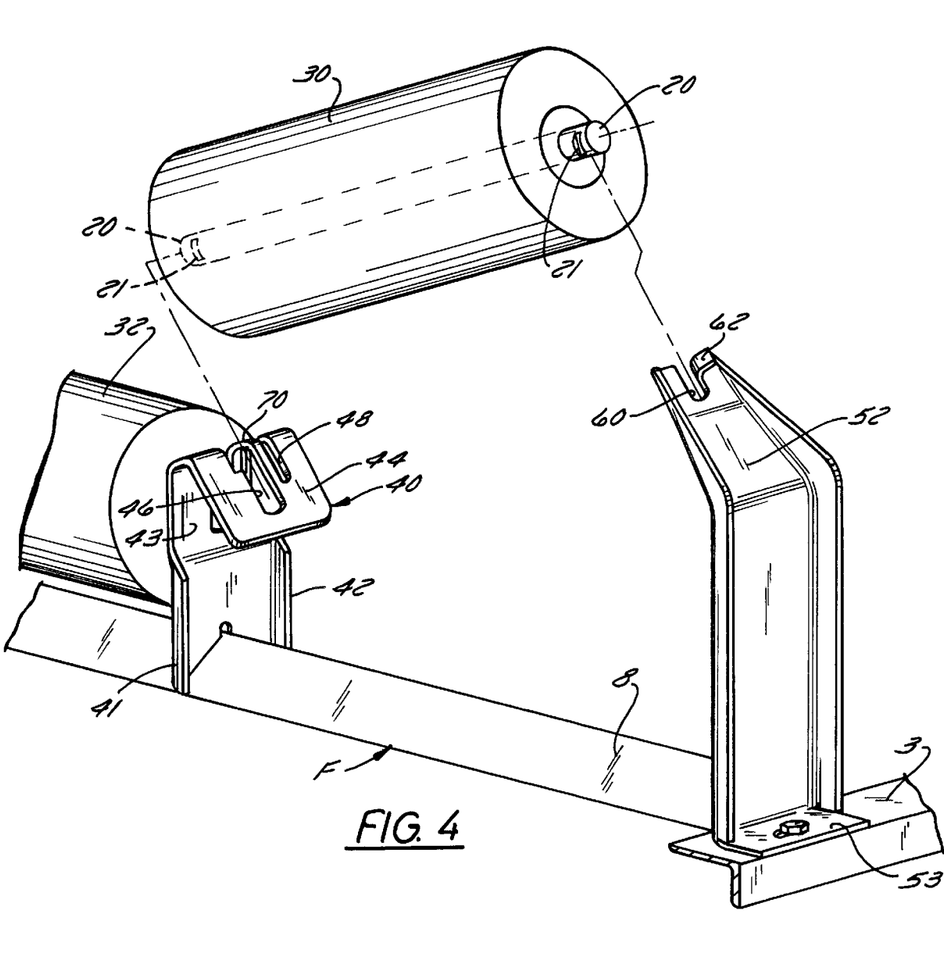
FIG. 4 is an enlarged perspective, exploded view of a portion of the conveyor frame shown in FIG. 1 and illustrating the outboard outer roller support bracket and the combined outer roller and center roller support bracket.
Figure 5:
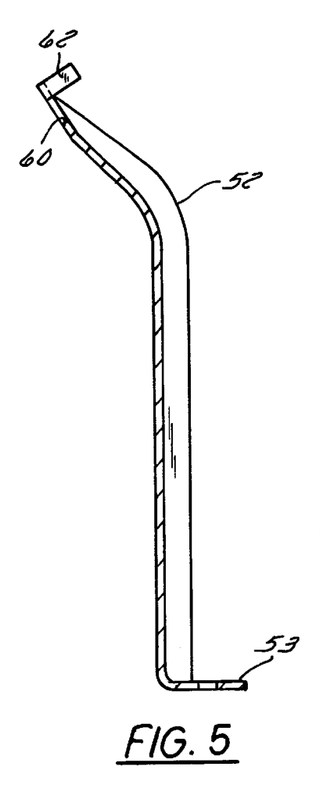
FIG. 5 is an enlarged cross sectional view of the outboard outer roller support bracket shown in FIG. 4.

There is also provided an outboard outer roller support bracket 52 (FIGS. 1 and 4) and this outer support bracket 52 has an integral foot portion 53 that is bolted or otherwise secured to the rail 3 as shown in FIG. 4.

Figure 6:
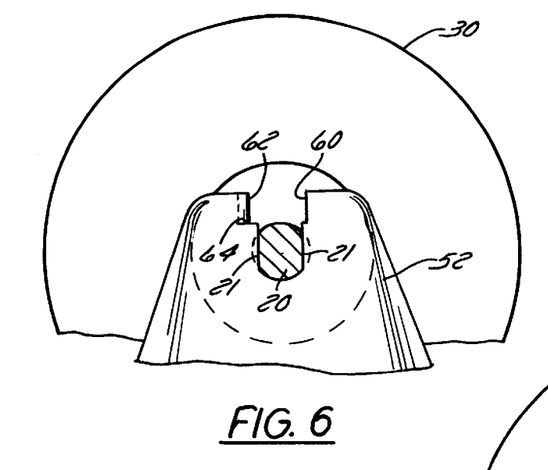
FIG. 6 is an enlarged, fragmentary, end view of the outer roller when inserted in the slot as shown in FIG. 4 and before the retaining tab is bent into locking position.
Figure 7:
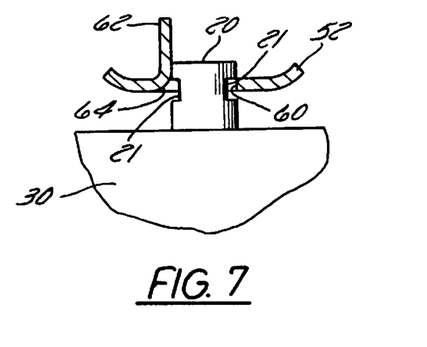
FIG. 7 is a fragmentary, enlarged, plan view of the roller after it has been inserted in the slot of the bracket.
Figure 8:
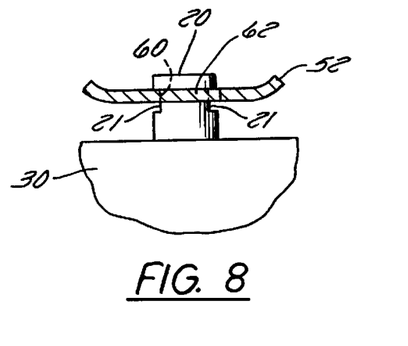
FIG. 8 is a view similar to FIG. 7 but showing the roller after it has been slid down into the slot and the tab has been twisted over the roller to hold it captive in the slot.
Figure 9:
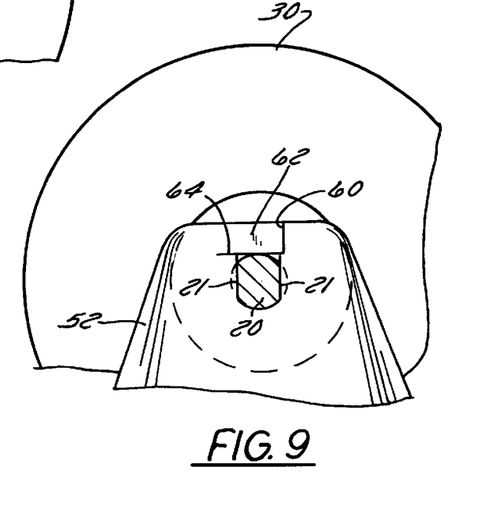
FIG. 9 is an end view of the arrangement shown in FIG. 8 and showing the tab in shaft holding position.

This outer roller support bracket 52 is fabricated as by being pressed from steel and terminates in an upper inwardly inclined end having a slot 60 that passes therethrough. (FIG. 4) This slot 60 is shown clearly in FIG. 6 and is of a width that permits the slotted end of the shaft 20 to be snuggly received in the slot 60. A tab 62 (FIGS. 4, 5, 6, and 9) is formed in the upper end of the bracket 50 by being cut generally at right angels along the line 64 (FIGS. 6 and 9) so that the tab may be turned as by twisting or pounding into the position shown in FIG. 9 where it extends across the shaft and holds the latter captive in the slot 60. This eliminates the need for other parts, clips or screws. This requires a minimum amount of effort and results in a clean locking arrangement for the shaft in the slot.

Referring again to the combined center and outer roller support bracket 40 as shown in FIGS. 10–15 the milled ends of the center roller 32 and outer roller 30 are inserted in the slot 46 that extends through the upper portion of the center bracket 40. After the milled ends of the rollers 30 and 32 are positioned in the slot 46 of the combined bracket, the combined tab 70 (FIG. 14) is bent over the ends of the adjacent shafts of rollers 30 and 32 (FIG. 22) and bears down on the upper sides of the shafts, thus holding them captive in their respective slots. In this manner the single tab 70 with a single bending operation is effective to hold the adjacent shafts securely in their respective slots. In this manner the outer rollers 30 and 31 can be readily assembled in their slots and held captive in their respective brackets without the use of additional clips or brackets.

As shown in FIGS. 1, 16–21, a bracket 80 is provided for the lower run of the flat return carrier conveyor. This bracket 80 can be utilized on either the left or right side of the conveyor (as shown in FIG. 1) and is located on each side of the lower return portion of the conveyor. The bracket 80 has a flange 81 (FIG. 16) by means of which is bolted or otherwise secured to the frame F as shown in FIG. 1.

The bracket 80 also has an inclined center portion 82 and an upper portion 83 in which are formed three, shaft receiving openings 84, 85, and 86. By providing the two openings 84 and 85, the bracket 80 may be used either on the left or right side of the conveyor apparatus as shown in FIGS. 1A, 1B and 1C.

Figure 1A:
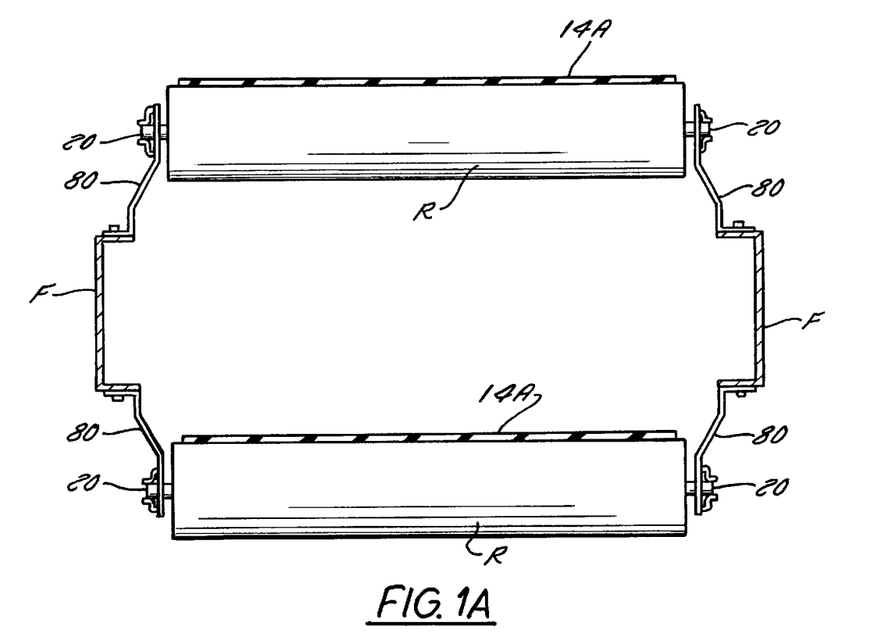
FIG. 1A is a cross-sectional view through a different type conveyor, namely, a flat conveyor and showing the combined bracket when being used as a rise bracket for supporting the upper run of a flat conveyor and the combined bracket is used for the right and left side of the lower run of the conveyor.
Figure 1B:
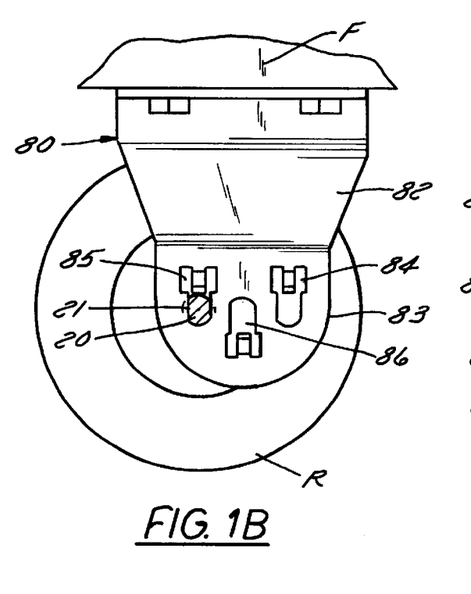
FIG. 1B shows the combined bracket on one side of the conveyor where opening 84 is used.
Figure 1C:
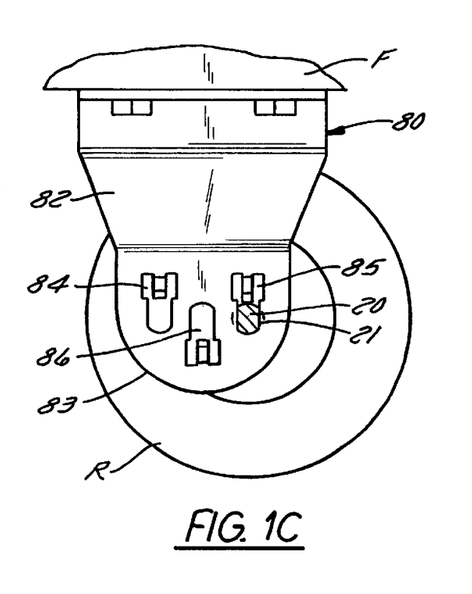
FIG. 1C shows the combined bracket on the other side of the conveyor where opening 85 is used.

The central opening 86 is provided for receiving the shaft 20 of the roller R when the bracket 80 is to be used as a rise bracket in a flat conveyor 14A to support the upper run of the belt (see FIG. 1A).

Figures 16, 18, 21:
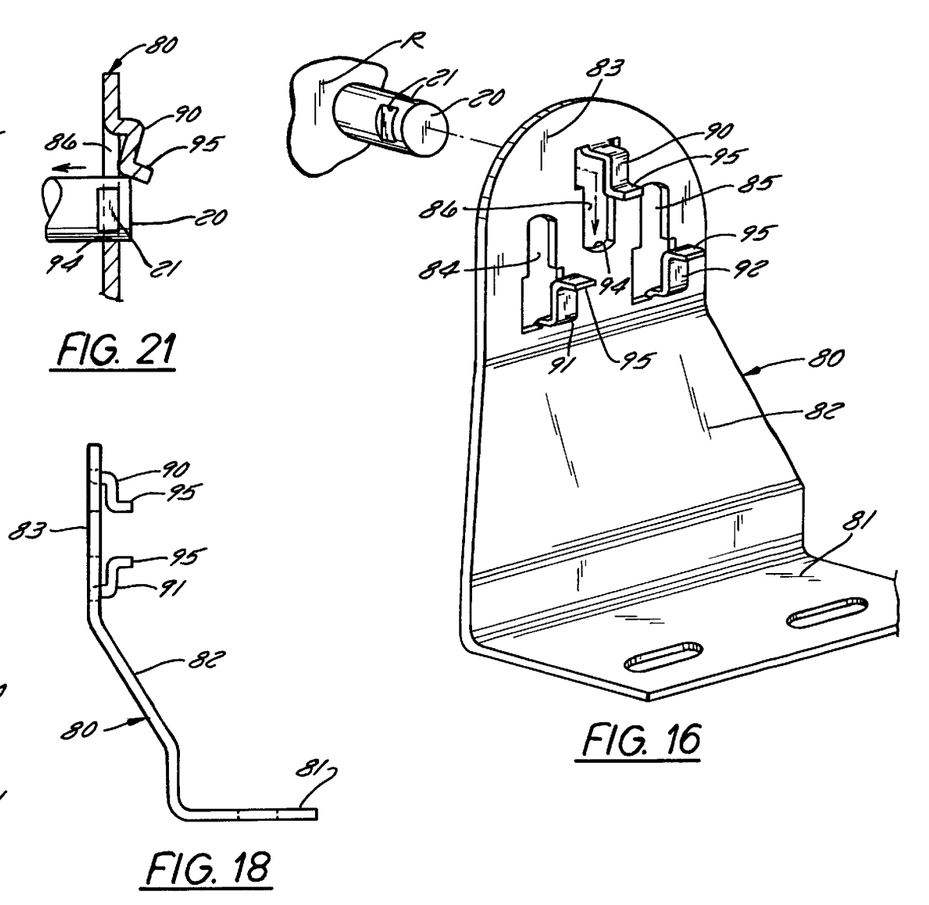
FIG. 16 is a perspective view of such a rise bracket in the upright position.
FIG. 18 is a side elevational view of the bracket shown in FIG. 17.
FIG. 21 shows the end of the tab bent over the end of the shaft to hold the shaft captive.
Figure 17:
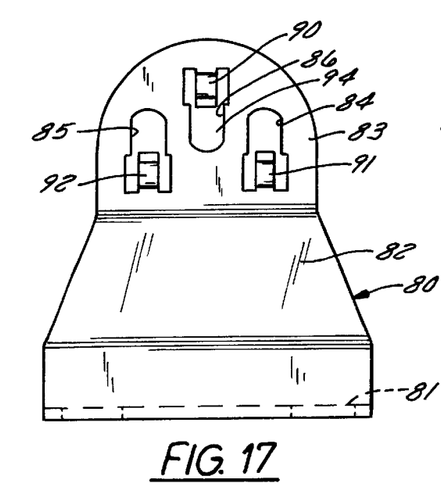
FIG. 17 is an elevational view of the bracket shown in FIG. 16.
Figure 19:
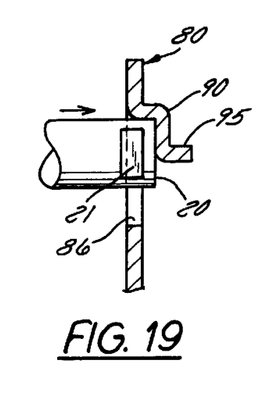
FIGS. 19–20 are illustrations of the shaft being inserted into the bracket, then being located snugly into the groove of the bracket so as to embrace the milled slots in the shaft.
Figure 20:
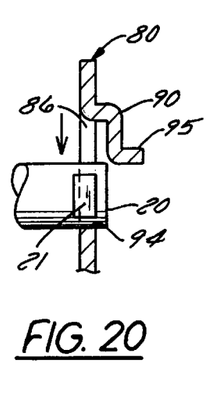

It will be noted in FIGS. 16–21 that the upper tab 90 and the two lower tabs 91 and 92 are formed by stamping so that the shaft when it is first engaged by the tab as shown in FIG. 19 abuts against a central portion of the tab, the shaft is then pushed downwardly into the narrower part of the opening 94 (FIG. 17) and then, while still being engaged in the milled slots of the shaft, the tab 95 needs only to be bent slightly over the end of the shaft (FIG. 21) to hold the shaft captive. When the openings 84 and 85 are used, either for the left or right side of the conveyor, the shaft is similarly positioned in the openings and held captive therein by the outer portion of the tabs. The arrangement shown in FIGS. 19–21 shows the shaft when in the bracket wherein the latter acts as a rise bracket to hold the roller elevated. No clips or screws are required. This bracket 80 may thus be referred to as a combined bracket because it combines two functions, a rise bracket and a hanger bracket.

Recapitulation

Thus the invention provides means for retaining the shafts in the end bracket 52 (FIGS. 1 and 4) by the tab 62 which can be easily bent over the shaft end by means of the cut 64 (FIG. 9) which extends generally at right angles from the slot 60.

The invention also provides a novel means for retaining the adjacent ends of the center and outer roller shafts in the center combined bracket 40 by means of a single tab 70 that can be bent into locking position over adjacent ends of the shafts.

The invention furthermore provides for the conveyor return brackets 80 to be utilized either as a left or right hand bracket or it can be used as a simple rise bracket. This involves the use of novel shaped flanges 90, 91 and 92 which act to position the shaft in the enlarged portion of the slot then the slotted portion of the shaft is pressed into holding engagement in the narrow portion of the slot. The overhanging end portion 95 of the novel shaped tabs is bent over the end of the shaft to hold the shaft captive.

What is claimed is:

1. An endless belt conveyor, having an elongated frame, an outboard outer roller support bracket mounted on said frame, said bracket having an upper end and a slot formed in said upper end, said slot having a tab at the outer end thereof, said tab formed by partially cutting said upper end of said support at substantially a right angle to said slot and at the upper end of said slot, whereby said tab may be bent across the shaft to hold the latter captive in the slot.

2. The conveyor set forth in claim 1, further characterized in that said support bracket has a lower end with a foot portion formed integrally therewith, and extended substantially at a right angle thereto and having means for being rigidly secured to said frame.

3. An endless belt conveyor, having an elongated frame, an outboard outer roller support bracket mounted on said frame, said bracket having an upper end and a slot formed in said upper end, said slot having a tab at the outer end thereof, said tab formed by partially cutting said upper end of said support at substantially a right angle to said slot and at the upper end of said slot, said support bracket having a lower end with a foot portion formed integrally therewith, and extended substantially at a right angle thereto and having means for being rigidly secured to said frame, the other end of said outer roller engaged in said slot in the upper end of said outer roller support bracket and held captive therein when said tab is folded over said other end.

4. An endless belt trough conveyor having an elongated frame and three rollers mounted on said frame and including a center roller and outer roller extending at an angle from each end of said center roller to form a trough for an upper run of an endless belt, said rollers each having a shaft extending from each end thereof, a combined support bracket mounted on said frame for lockably and rotatably supporting adjacent ends of said roller, said bracket having a first slot formed therethrough for rotatably supporting adjacent ends of said roller, said bracket having a first slot formed therethrough for rotatably receiving adjacent ends of said center and said outer roller, and a second slot formed in said bracket and adjacent and generally parallel to said first slot to thereby forma tab therebetween, said tab bendable over said adjacent ends to embrace said adjacent ends and rotatably hold said ends captive in said first slot.

5. An idler bracket for the flat return portion of an endless belt conveyor, a roller shaft having milled slots at its ends and on opposite sides thereof, said bracket having three spaced apart apertures formed by punching a tab partially therefrom, said apertures having an enlarged portion and a narrower portion, said tabs being generally S shaped in cross-section, said apertures adapted to receive said roller shaft by its milled slots at its ends, said shaft initially received in said enlarged portion, and said shaft ends with said milled slots subsequently snugly receivable in said narrower portion, said tabs being bent over the shaft end to hold the shaft captive.

6. An endless flat belt conveyor having an upper trough shaped portion and a lower flat return portion, an elongated steel frame for supporting said belt conveyor, said trough shaped portion formed by a series of three rollers arranged transversely across the upper portion of said elongated frame, said series including a center roller having opposite ends, and an outer roller extending at an upwardly inclined angle from each end of said center roller; said outer rollers each having opposite ends, one of said ends of each outer roller being adjacent each of said opposite ends of said center roller, a combined support bracket mounted on said frame for lockably and rotatably supporting adjacent ends of said outer roller and said center roller, said bracket having a first slot formed therethrough for rotatably receiving said adjacent ends of said center and said outer rollers, and a second slot formed in said bracket and adjacent and generally parallel to said first slot to thereby form a tab therebetween, said tab bendable over said adjacent ends to embrace said adjacent ends and rotatably hold said ends captive in said first slot.

7. An endless flat belt conveyor having an upper trough shaped portion and a lower flat return portion, an elongated steel frame for supporting said belt conveyor, said trough shaped portion formed by a series of three rollers arranged transversely across the upper portion of said elongated frame, said series including a center roller having opposite ends, and an outer roller extending at an upwardly inclined angle from each end of said center roller; said outer rollers each having opposite ends, one of said ends of each outer roller being adjacent each of said opposite ends of said center roller, a combined support bracket mounted on said frame for lockably and rotatably supporting adjacent ends of said outer roller and said center roller, said bracket having a first slot formed therethrough for rotatably receiving said adjacent ends of said center and said outer rollers, and a second slot formed in said bracket and adjacent and generally parallel to said first slot to thereby form a tab therebetween, said tab bendable over said adjacent ends to embrace said adjacent ends and rotatably hold said ends captive in said first slot, a combined idler bracket for opposite sides of said flat return portion of said endless belt conveyor, a belt return roller having a shaft with milled slots at its ends and on opposite sides thereof, said combined bracket having three spaced apart apertures formed by punching a tab partially therefrom, said apertures having an enlarged portion and a narrower portion, said tabs being generally S shaped in cross-section, said apertures adapted to receive said roller shaft by its milled slots at its ends, said shaft initially received in said enlarged portion, and said shaft ends with said milled slots subsequently snugly receivable in said narrower portion, said tabs engagable by said shaft end to form a stop therefor and position said slots in said narrower portion.

8. An endless flat belt conveyor having an upper trough shaped portion and a lower flat return portion, an elongated steel frame for supporting said belt conveyor, said trough shaped portion formed by a series of three rollers arranged transversely across the upper portion of said elongated frame, said series including a center roller having opposite ends, and an outer roller extending at an upwardly inclined angle from each end of said center roller; said outer rollers each having opposite ends, one of said ends of each outer roller being adjacent each of said opposite ends of said center roller, a combined support bracket mounted on said frame for lockably and rotatably supporting adjacent ends of said outer roller and said center roller, said bracket having a first slot formed therethrough for rotatably receiving said adjacent ends of said center and said outer rollers, and a second slot formed in said bracket and adjacent and generally parallel to said first slot to thereby form a tab therebetween, said tab bendable over said adjacent ends to embrace said adjacent ends and rotatably hold said ends captive in said first slot,     an outboard outer roller support bracket mounted on said frame, said bracket having an upper end and a slot formed in said upper end, said slot having a tab at the outer end thereof, said tab formed by partially cutting said upper end of said support at substantially a right angle to said slot and at the upper end of said slot, said support bracket having a lower end with a foot portion formed integrally therewith, and extended substantially at a right angle thereto and having means for being rigidly secured to said frame, the other end of said outer roller engaged in said slot in the upper end of said outer roller support bracket and held captive therein when said tab is folded over said other end.

9. An endless flat belt conveyor having an upper trough shaped portion and a lower flat return portion, an elongated steel frame for supporting said belt conveyor, said trough shaped portion formed by a series of three rollers arranged transversely across the upper portion of said elongated frame, said series including a center roller having opposite ends, and an outer roller extending at an upwardly inclined angle from each end of said center roller; said outer rollers each having opposite ends, one of said ends of each outer roller being adjacent each of said opposite ends of said center roller, a combined support bracket mounted on said frame for lockably and rotatably supporting adjacent ends of said outer roller and said center roller, said bracket having a first slot formed therethrough for rotatably receiving said adjacent ends of said center and said outer rollers, and a second slot formed in said bracket and adjacent and generally parallel to said first slot to thereby form a tab therebetween, said tab bendable over said adjacent ends to embrace said adjacent ends and rotatably hold said ends captive in said first slot,     an outboard outer roller support bracket mounted on said frame, said bracket having an upper end and a slot formed in said upper end, said slot having a tab at the outer end thereof, said tab formed by partially cutting said upper end of said support at substantially a right angle to said slot and at the upper end of said slot, said support bracket having a lower end with a foot portion formed integrally therewith, and extended substantially at a right angle thereto and having means for being rigidly secured to said frame, the other end of said outer roller engaged in said slot in the upper end of said outer roller support bracket and held captive therein when said tab is folded over said other end, and a combined idler bracket for opposite sides of said flat return portion of said endless belt conveyor, a belt return roller having a shaft with milled slots at its ends and on opposite sides thereof, said combined bracket having three spaced apart apertures formed by punching a tab partially therefrom, said apertures having an enlarged portion and a narrower portion, said tabs being generally S-shaped in cross section, said apertures adapted to receive said roller shaft by its milled slots at its ends, said shaft initially received in said enlarged portion, and said shaft ends with said milled slots subsequently snugly receivable in said narrower portion, said tabs being bent over the end of said shaft to hold the latter captive in the slot.

* * * * *